United States Patent [19]

Williams

[11] 3,768,905
[45] Oct. 30, 1973

[54] METHOD AND APPARATUS FOR INSPECTION OF PHOTOGRAPHIC PRINTS
[75] Inventor: Raymond Joseph Williams, Rochester, N.Y.
[73] Assignee: Eastman Kodak Company, Rochester, N.Y.
[22] Filed: Mar. 15, 1972
[21] Appl. No.: 234,751

[52] U.S. Cl. .................. 355/77, 355/41, 355/112
[51] Int. Cl. ............................................. G03b 27/32
[58] Field of Search .................. 355/40, 41, 53, 88, 355/95, 97, 112, 77

[56] References Cited
UNITED STATES PATENTS
3,516,741   6/1970   Thaddey ......................... 355/41 X
3,600,089   8/1971   Walter ............................. 355/40 X
FOREIGN PATENTS OR APPLICATIONS
898,550   11/1953   Germany ........................... 355/97

Primary Examiner—Fred L. Braun
Attorney—William H. J. Kline et al.

[57] ABSTRACT
Print inspection and reprint apparatus for cooperation with a photographic printer wherein negatives in a roll of spliced film orders are advanced stepwise into the exposure station of the photographic printer in synchronization with the continuous advancement of finished photographic prints on a print roll through a print inspection station. The operator of the inspection apparatus inspects the prints as they advance continuously through the print inspection station, halts the advancement of unacceptable prints in the print inspection station, marks such unacceptable prints and reprints, with appropriate exposure correction, the corresponding negative located in the exposure station of the photographic printer. The prints continuously move through the inspection station at a variable, operator controlled speed. The stepwise negative advancement synchronized to the continuous advancement of the prints is controlled by a circuit responsive to print marks and order separation marks on the prints and splices attaching ends of successive negative filmstrips. Synchronization is maintained under conditions including: 1) full orders of prints and negatives; 2) two prints per negative; 3) fewer prints than negatives in a single order; 4) fewer prints than negatives in successive orders; and 5) fewer negatives than prints. When the photographic print material is exhausted in the printer, it is developed, and the remake prints may be synchronized to the original print orders to complete the customer print orders.

25 Claims, 3 Drawing Figures

Patented Oct. 30, 1973

METHOD AND APPARATUS FOR INSPECTION OF PHOTOGRAPHIC PRINTS

BACKGROUND OF THE INVENTION

1. Field of the Invention

This invention relates to photographic apparatus, and more particularly to a photographic printer adapted for the inspection of finished photographic prints and the reprinting in the photographic printer of those originals from which unsatisfactory prints have been made with a corrected exposure based on the assessment made of the unsatisfactory print.

2. Description of the Prior Art

It has become a customary practice of the photofinishing industry to provide apparatus for splicing the ends of individual customer film order negative filmstrips together and continuously processing the spliced negative filmstrips. The spliced filmstrips are thereafter spooled and placed on a photographic printer for automatic or semi-automatic printing of each negative on a continuous roll of photosensitive photographic print material. The sensitized photographic print material is thereafter developed and dried in a continuous process. Each print in the roll is thereafter inspected to determine if it is a commercially acceptable print. Overexposed, under-exposed or color subject failure prints are marked by the inspector as being unacceptable and requiring, when possible, reprinting. During the first printing, print marks are printed on the print border adjacent each print, and order separation marks are printed adjacent a selected print of each print order to separate print orders.

Among the proposals that have been made to improve and complete the automation of the process of inspecting and reprinting originals or negatives is that apparatus disclosed in U.S. Pat. No. 3,516,741, entitled APPARATUS FOR MAKING PRINTS FROM COLOR NEGATIVES, to Kurt Thaddey, wherein an inspection table is disclosed including a viewing station for examining the prints made from the negatives and means for feeding the prints stepwise past the viewing station in synchronism with the stepwise passage of corresponding negatives a second time through the printer for re-exposure at the exposure station of any of the negatives from which unsatisfactory prints have been made. Furthermore, manually operable means are coupled to the exposure control means of the printer to supply exposure correction information thereto in accordance with the assessment made of an unsatisfactory print by the person inspecting the prints, the manually operable means being actuable to cause a corrected exposure of the negative currently at the exposure station, and further means are disclosed for checking the synchronism of the prints advanced to the viewing station with the second passage of the negatives through the printer. The maintenance of synchronism is checked from time to time by the fact that a splice between film orders and an order separation mark on the first or last print of a customer print order must coincide and be simultaneously detected so that a fault signal is prevented from being generated. In the event of non-coincidence, the fault signal is generated and indicates to the person at the viewing table that correspondence of the negatives with the prints must be restored.

Further apparatus of this type of which I am aware provides for the continuous advancement of the prints through the viewing station of an inspection table as the negatives are advanced through the printing station of the photographic printer. Similarly, in the event of non-coincidence of the detected splices and order separation marks, a fault signal is generated to indicate to the person at the inspection table that correspondence of the negative film and the photographic print on the print roll must be restored.

When customer film orders containing a number of photographic originals or negatives are printed, it may occur that a multiple number of prints of each negative are made since customers often request more than one print of all or certain of the negatives. Conversely, many times certain of the negatives may be determined at the time of printing to be too over-exposed or fogged or under-exposed or blank to produce an acceptable print and the number of prints in the order are less than the number of negatives. Occasionally, all of the negatives of a customer film order may be unacceptable for printing due to the aforementioned conditions occasioned by camera malfunction, improper storage or handling or other errors, and in such instance only one exposure is made of perhaps the last frame of the customer film order so that an order separation mark may be placed on the single exposure to separate each series of customer print orders on the print roll. Consequently, a print roll may contain, in any sequence, customer print orders that are equal to, or less than or greater than, the number of negatives in the corresponding customer film order. Fault signal apparatus responsive to detected splices and order separation marks of the type hereinbefore described require an operator for re-establishing synchronism of customer film orders to customer print orders. The continued requirement to re-establish synchronism may constitute an undue burden upon the operator of such print inspection and reprinting apparatus.

SUMMARY OF THE INVENTION

Accordingly, it is an object of the present invention to synchronize corresponding customer film and print orders advanced through print inspection and reprinting apparatus.

Furthermore, it is an object of the present invention to establish and maintain synchronization of negatives and prints in corresponding customer film and print orders advanced through print inspection and reprinting apparatus.

It is also an object of the present invention to synchronize corresponding customer film and print orders advanced through print inspection and reprinting apparatus and containing: 1) numerically equal prints and originals; 2) two or more prints every original; 3) fewer prints than originals in at least one print order; 4) fewer prints than originals in successive print orders; and 5) fewer negatives than prints.

A further object of this invention is to provide a synchronization method and apparatus to advance originals in customer film orders into an exposure station of a printer in response to the advancement of prints in corresponding print orders through a print inspection station.

In accordance with these and other objects of the invention, methods and apparatus are disclosed for advancing finished photographic prints in a series of consecutive customer print orders on a roll of developed print material through a print inspection station for inspecting the prints to detect commercially unacceptable prints and to reprint, with the correction necessary to produce an acceptable print, the corresponding photographic original in the corresponding customer original film order of a plurality of customer film orders attached together at their respective ends to form a film roll, each customer print order having a selected print associated therewith to indicate separate consecutive print orders. Furthermore, the invention comprises synchronization methods and apparatus responsive to the continuous advancement of the prints for controlling the stepwise advancement of the originals of a customer film order corresponding to the print order through the exposure station of a photographic printer associated with the print inspection apparatus, whereby the original in the exposure station corresponding to a print found to be commercially unacceptable may be reprinted in the photographic printer, said synchronization being accomplished by: 1) detecting the continuous advancement of each print into said print inspection station and stepwise advancing an original into said exposure station in response to each detected print; 2) detecting the selected prints associated with each customer print order continuously advanced into said print inspection station and continuously advancing the originals in the customer film order through said exposure station in response to each detected print; 3) detecting the attached ends of the plurality of customer film orders and halting the continuous advancement, initiated by said selected print detecting means, of the originals in the customer film order through said exposure station after the detected attached end is advanced through said exposure station; and 4) halting the continuous advancement of a commercially unacceptable print within the print inspection station, whereby the corresponding original in said exposure station of said photographic printer may be reprinted with exposure corrections based on the assessment of the exposure conditions of the unacceptable print.

The synchronization method and apparatus also establishes and maintains synchronization of customer film and print orders under the following conditions: 1) corresponding full orders of prints and negatives; 2) two prints for every negative; 3) fewer prints than negatives in a first customer order, where the order separation mark of a succeeding, second customer order of prints does not occur before the splice connecting the respective first and second customer film orders passes the film gate; 4) fewer prints than negatives in first and second successive corresponding customer film and print orders, wherein the order separation mark on the second customer print order occurs before the splice connecting the first and second customer film orders passes the film gate; and 5) fewer negatives than prints in corresponding customer film and print orders.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Figure 1:
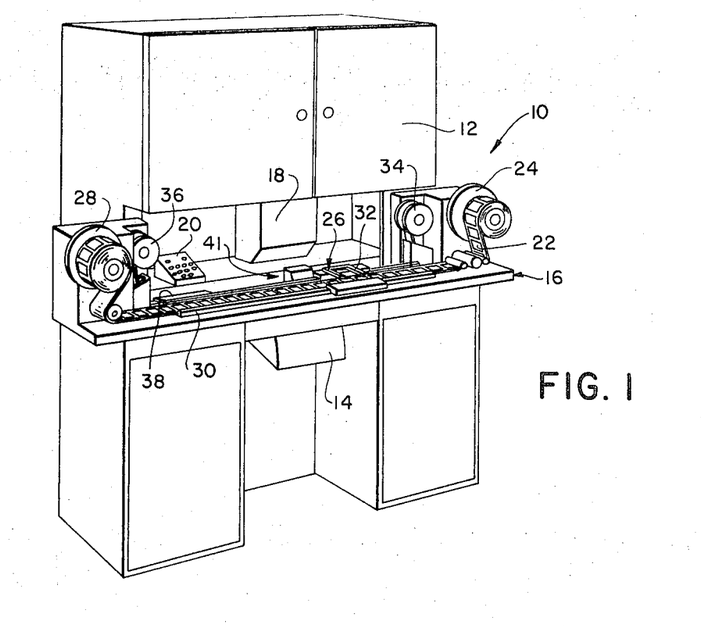
FIG. 1 is a perspective view of the print inspection and remake apparatus of the present invention positioned upon a photographic color printer.

Referring now to the drawings in first of FIG. 1, there is shown in partial perspective a view of the photographic print inspection and reprinting apparatus of the present invention detachably positioned upon a photographic color printer 10 which may be a Kodak Model 5S-3-K printer, or its equivalent. The printer 10 may be equipped with roll paper supply and take-up magazines and apparatus for advancing a roll of photosensitive photographic print material from the supply magazine through the exposure station of the photographic printer to the take-up magazine, all such components being enclosed in the light-tight cabinet 12. The color printer is also equipped with an exposure lamphouse 14 located beneath the table of the photographic printer and operative to project printing light through a negative positioned in the printing station of the printer 10. The printing light beam directed through the photographic negative is projected by projection lens encased in the lens assembly housing 18 onto the photosensitive photographic print material located in the print exposure station within the light-tight cabinet 12.

Three subtractive primary color filters may be located within the exposure lamphouse 14 and are operative, in conjunction with associated exposure control circuits, to terminate exposure of the photosensitive print material to light of the three respective primary colors passing through the negative after respective time periods dependent upon the intensities of such primary colors of light detected by three respective primary color measuring photosensors. A keyboard assembly 20 is provided with a number of subject classification and color correction buttons that the operator of the printer may depress to alter the exposure paramters to produce a commercially acceptable print from a negative that requires classification and correction.

Because the operation and features of such photographic printing apparatus are well known in the prior art, the present description will be directed in particular to elements forming part of, or cooperating more directly with, the present invention. The Kodak Model 5S-3-K Printer is described in greater detail in its operation manual published by the Eastman Kodak Company.

Figure 2:
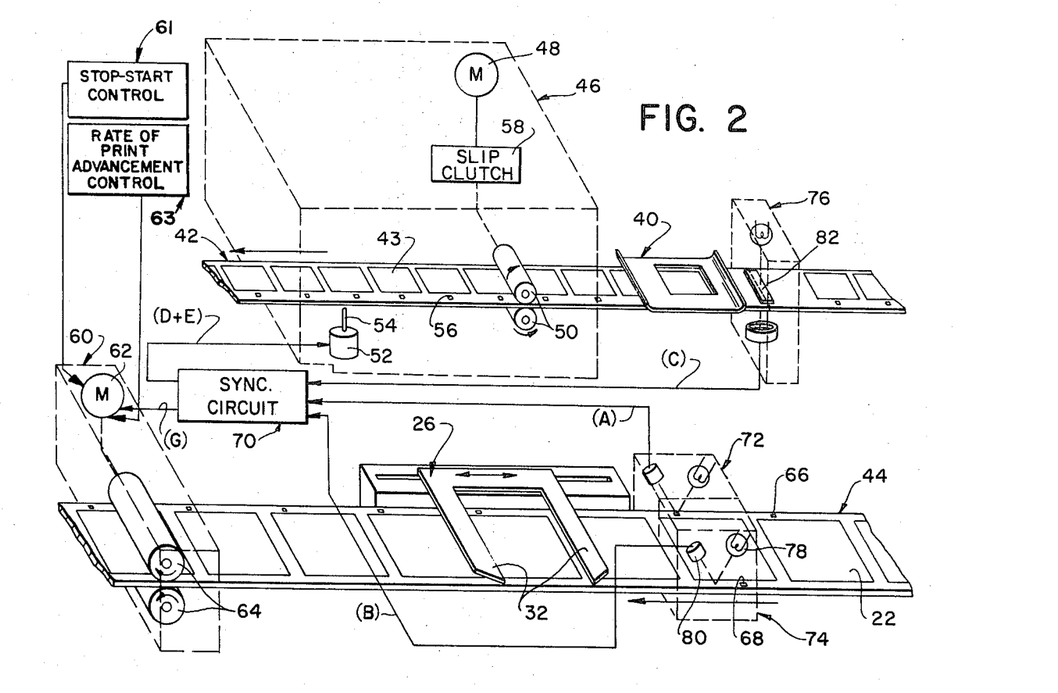
FIG. 2 is a diagram, in partial perspective and block diagram form, showing apparatus for maintaining synchronism between the movement of the spliced customer film orders to an exposure station of photographic color printer with the movement of corresponding finished photographic prints through an inspection station.

The inspection and reprint apparatus 16 comprises a detachable, unitary structure for continually advancing finished photographic prints 22 in a roll of such prints from a supply magazine 24 through a print viewing and inspection station 26 and to a print take-up magazine 28 through the action of a paper drive motor shown more particularly in FIG. 2. Adjustable width paper guides 30 are provided so that more than one paper width may be accommodated. The print inspection station 26 comprises marking guides 32 which may be manually adjusted to accommodate prints of more than one size. A print illuminator, with light of the proper color temperature for reliable print inspection, may be provided.

A film drive assembly is also provided comprising roll film supply and take-up reels 34 and 36, respectively, a film track 38 and a film gate 40 (FIG. 2) located at the exposure station 41 of the printer 10. The negatives of each customer film order are stepwise advanced through the film gate 40 from the film supply reel 34 to the film take-up reel 36 by a tendency film drive mechanism shown in FIG. 2 and described in greater detail hereinafter. The film track 38 and film gate 40 may be readily removed and replaced in order to accommodate rolls of photographic original films of varying sizes. A magnifying lens (not shown) may be located adjacent the film gate 40 for viewing the negative image located in the film gate 40 to assist the operator in visually verifying the synchronism of the negative in the film gate to the print in the marking guide 32 and to assist the operator to determine the negative classification and color correction to be entered on the keyboard switches of the keyboard assembly 20 in making a reprint of the photographic print found to be unacceptable.

The print inspection and reprint apparatus 16 may also be provided with a number of operator controls (not shown) conveniently located and including: 1) a push-button switch to start and stop print advance; 2) a dial control to vary the rate of print advancement to suit the operator's capacity to inspect the prints; 3) an over-riding push-button switch for instant change from maximum print advancement rate to 50 percent of maximum, when more time is needed to inspect the print when, for example, a sequence of prints must be made over; 4) a push-button switch for single negative advance to match a negative with a print in the print inspection station 26 requiring make-over, if there is a mismatch due to unprinted negatives, in the particular customer film order; 5) a push-button switch for customer print orders containing two (or more) prints for each negative, to maintain print and negative synchronization; 6) a push-button switch for reversing the paper drive in the event that the operator wishes to remake a print which has already passed the print inspection station 26; 7) a power switch; and 8) a switch to activate one or the other of dual print mark and order separation mark detectors. The enumerated controls are illustratory and others may be added for other functions suggested by the operation of the print inspection and reprint apparatus 16. The operation will be described in greater detail with respect to the film and paper advancing apparatus and the synchronization circuit 70 of FIGS. 2 and 3.

Referring now to FIG. 2, there is shown in partial perspective and block diagram form a synchronization circuit 70 and film and paper drive assemblies in cooperation with a segment 42 of film containing negatives 43 and a segment 44 of photographic prints 22. The film segment 42 is advanced from right to left through the operation of a tendency film drive assembly 46 comprising a film drive motor 48, a pair of film drive rollers 50 arranged to engage opposite surfaces of the film segment 42, a film drive solenoid 52 having a detent 54 adapted to intercept the sprocket holes 56 located adjacent each negative frame 43 when the film drive solenoid 52 is not energized, and a slip clutch 58 adapted to transmit rotary motion from the film drive motor 48 to the film drive rollers 50 when the detent 54 of the film drive solenoid 52 is withdrawn from the sprocket hole 56. Thus, upon the momentary energization of the film drive solenoid 52, the detent 54 is withdrawn from engagement with a sprocket hole 56 and the slip clutch 58 is operative to transmit rotary motion to the film drive roller 50 to advance the film segment 42 from right to left. Upon de-energization of the film drive solenoid 52, the detent 54 is released to engage the next sprocket hole 56 advancing from right to left with the advancement of the film segment 42 to thereby halt further film advancement through the operation of the slip clutch 58.

The paper drive assembly 60 may comprise a paper drive motor 62 adapted to impart rotary motion to a pair of paper drive rollers 64 that engage opposite surfaces of the photographic print segment 44 to advance the segment 44 continuously from right to left. The motor 62 may be provided with appropriate controls for selectively stopping, starting, reversing and varying the rate of advancement of the paper segment 44 as mentioned hereinbefore. Such controls may include, for example, stop-start control 61 which may, as mentioned above, be a push button switch for selectively starting and stopping motor 62 for starting and stopping advancement of paper segment 44 and also may include rate of print advancement control 63 which may, as mentioned above, be a dial control for varying the rate of advancement of paper segment 44.

Print marks 66 are located adjacent each photographic print 22 on one border of the paper segment 44. Order separation marks 68 appear on the other border of the paper segment 44 to separate customer print orders. The print marks 66 are contact printed at the time of exposure of the corresponding photographic print, and the order separation marks 68 are contact printed adjacent the first or last (or only) prints made of negatives of a customer film order. The print marks 66 and order separation marks 68 may also be contact printed or otherwise placed on the opposite surface of the photographic print material, and such marks are normally employed in the photofinishing industry for purposes other than those disclosed with respect to the present invention.

As stated hereinbefore, it is an object of the present invention to synchronize the advancement of respective negatives 43 into the printing station of the photographic printer 10 with the advancement of the corresponding photographic print 22 into the print inspection station 26 of the print inspection and reprint apparatus 16 of the present invention. In FIG. 2, the exposure station of the photographic printer is designated by the film gate 40 and the print inspection station 26 is indicated by the marking guide 32. The remaining elements of FIGS. 2 and 3 cooperate to provide such synchronization. In brief, the stepwise advancement of the negative frames 43 into the film gate 40 is prompted by the momentary energization of the film advance solenoid 52 by the film drive signal D produced by synchronization circuit 70 in response to the direction of each of the print marks 66 by the print mark reflective pick-up 72 and the production of a print mark signal A. The synchronization circuit 70 also responds to an order separation signal B and a splice signal C developed by order separation mark reflective pick-up 74 and the splice detector 76, respectively, to synchronize customer order films with their respective customer print orders in a manner to be described in greater detail hereinafter. The reflective pick-ups 72 and 74 each comprise a miniature light or radiation source 78, for example, that directs light of a predetermined wavelength upon a predetermined border area of the path of travel of the print segment 44. The light is reflected by the glossy surface of the photographic print material and upon a photosensor 80 that is rendered conductive in direct proportion to the amount of light reflected by the surface of the print material. The amplitudes of the print mark and order separation mark signals A and B, respectively, will vary when the light from light source 78 strikes a dull or light absorbing print or order separation mark 66 or 68, respectively, on the surface of the photographic print material. Although the pick-ups 72 and 74 are shown adjacent the top surfaces of the segment 44, it will be understood that further reflective pick-ups may be positioned to intercept cut marks and order sort marks printed upon the opposite surface of the print material.

The splice detector 76 also comprises a light or radiation source and photosensor. However, the light source is located adjacent one surface of the film segment 42, and the photosensor is located adjacent the opposite surface of the film segment 42. The film segment 42 normally transmits the predetermined wavelengths of light emitted by the light source of the splice detector 76. However, splices such as splice 82 that attach ends of successive customer film orders together absorb the wavelength of light emitted by the light source of the splice detector 76 so that the photosensor of the splice detector 76 receives little or no light. The amplitude of the output signal developed by the photosensor changes in response to the change in light intensity sensed by the photosensor to develop a splice signal that is applied to the synchronization surface 70. It will be understood that the splice detector 76 may also operate in the reflective mode of operation employed by the pick-ups 72 and 74. It will also be understood that the light source could constitute a beam of light directed from the exposure lamphouse 14 of the printer 10 upon the splice 82.

Figure 3:
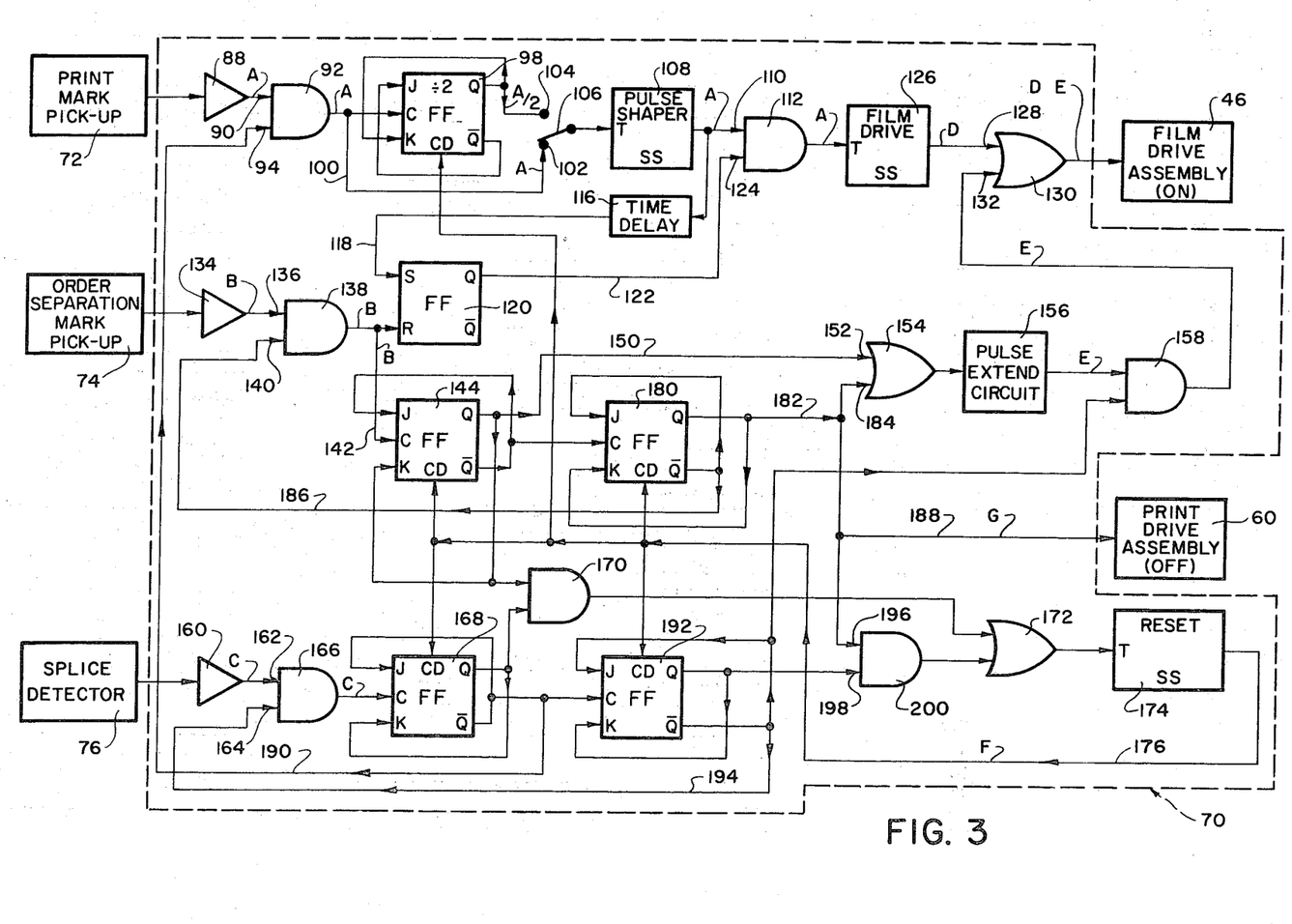
FIG. 3 is a schematic illustration of a circuit for maintaining automatic synchronism of the negatives with the finished photographic prints.

Referring now to FIG. 3, there is shown in greater detail the synchronization circuit 70 of FIG. 2. The various logical elements of the synchronization circuit of FIG. 3 respond to the print mark signal A generated by the pick-up 72, and order separation mark signal B generated by the order separation mark pick-up 74 and a splice signal C generated by the splice detector 76 to control the stepwise advancement of the negatives 43 into the film gate 40 in response to the continuous advancement of a corresponding photographic print 22 into the print inspection station 26. The synchronization circuit also responds to the aforementioned signals to establish and maintain synchronization of customer film and print orders under the following conditions: 1) corresponding full orders of prints and negatives; 2) two prints for every negative; 3) fewer prints than negatives in a first customer order, where the order separation mark of a succeeding, second customer order of prints is not detected until after the splice connecting the respective first and second customer film orders passes the film gate; 4) fewer prints than negatives in first and second successive corresponding customer film and print orders, wherein the order separation mark on the second customer print order is detected before the splice connecting the first and second customer film orders passes the film gate; and 5) fewer negatives than prints in corresponding customer film and print orders. The identity and function of each of the logic elements shown in the synchronization circuit of FIG. 3 are well known in the prior art. Accordingly, such logic elements shall be identified and described in conjunction with its operation in the synchronization circuit 70 under the aforementioned five conditions.

Condition 1: Full Print and Negative Orders

The print mark pick-up 72 is connected to amplifier 88 and a print mark signal A (assumed to be a positive going pulse) is produced at the output of amplifier 88 upon the detection of each print mark 66, and the signal A is applied to a first input terminal 90 of AND gate 92. During the normal operation of the synchronization circuit, a positive signal level will be applied to the second input terminal 94 of the AND gate 92, and the AND gate 92 gates the signal A to the C input of J-K flip-flop 98 which is connected to operate as a frequency divider and along a second conductor 100 to a first switch contact 102. Assuming that the flip-flop 98 has been reset by a signal applied to the CD input, the Q output is in the low state or level and the Q̄ output is in the high state or level. The signal A applied to the C input following the reset of the flip-flop 98 switches the Q output to the high level and the Q̄ output to the low level. The Q and Q̄ outputs are respectively connected to the K and J inputs of the J-K flip-flop 98, and the J-K flip-flop 98 operates in a manner well known in the prior art as each signal A applied to the C input switches the output Q or Q̄ having a high level at its input J or K, respectively, to the high level.

Thus, the ÷ 2 flip-flop 98 responds to every other print mark signal A to produce a print mark signal A/2 at the second switch contact 104 (connected to the Q output of flip-flop 98) having a frequency of pulse repetition equal to half that of the signal A. Under Condition 1, a movable switch blade 106 contacts the first switch contact 102 to apply only the signal A to a pulse shaping single shot 108 which is necessary to provide a pulse of constant duration in response to each signal A or A/2. The signal A is applied along a first conductor to the first input terminal 110 of AND gate 112 and by a second conductor to a time delay circuit 116. The time delay circuit 116 delays the signal A for a predetermined time and applies it by conductor 118 to the S input of R-S flip-flop 120. The R-S flip-flop 120 responds to the time delayed print mark signal A to switch (or maintain) the level at the Q output of the R-S flip-flop 120 to a high state. The high state or level of the Q output of the flip-flop 120 is transmitted by conductor 122 to the second input terminal 124 of AND gate 112.

The time delay circuit 116, the flip-flop 120 and the AND gate 112 are provided to prevent the first signal A that is produced, in time, after an order separation mark signal B is produced from initiating a negative advance. As described in greater detail hereinafter, the signal B, after amplification and gating, is applied to the R input of the R-S flip-flop 120 to switch the Q output of the flip-flop 120 to its low state. However, first signal A following the signal B is delayed in time by the time delay 116 and switches the Q output of the flip-flop 120 to its high state only after the signal A applied to terminal 110 of gate 112 has disappeared. Thus, no signal will be passed through gate 112 at this time.

However, the second pulse of the signal A, which will occur after the Q output from flip-flop 120 has been restored to its high level, will be gated by AND gate 112 to the T input of the film drive single shot 126. The single shot 126 responds to the signal A to produce a first film drive signal D, which is a positive-going pulse having a constant duration determined by the single shot 126, and the first film drive signal D is applied to a first input terminal 128 of OR gate 130. OR gate 130 gates the first film drive signal D to the film drive solenoid 52 to energize the film solenoid 52 in the manner described hereinbefore with respect to FIG. 2. The film drive solenoid 52 is energized for a period of time sufficient to allow the release and advancement of the negative film.

Thus the logic elements described so far provide for the stepwise advance of the negatives of the film into the film gate 40 in response to the detection of each of the cut marks 66 except the first cut mark on the first print of a customer print order following an order sort mark.

The signal B produced by the order separation mark pick-up 74 and amplifier 134 is also a positive going pulse signal, and it is applied to a first input terminal 136 of AND gate 138. Normally a positive or high level occurs at the second input terminal 140 of the AND gate 138, and the signal B is applied as described hereinbefore to the R input of the flip-flop 120 and is also applied by a conductor 142 to the Clock C input of the J-K flip-flop 144. Assuming that the flip-flop 144 has been reset by a signal applied to the CD input, the Q output is in the low state or level and the Q output terminal is in the high state or level. The signal B' applied to the C input following the reset of the flip-flop 144 switches the Q output terminal to the high level and the Q output to the low level. The Q and Q outputs are respectively connected by conductors to the K and J inputs of the J-K flip-flop 144, and the J-K flip-flop 144 operates in the manner described hereinbefore with respect to flip-flop 98.

The high level of the Q output of the flip-flop 144 is applied by conductor 150 to the first input terminal 152 of OR gate 154 that gates it to a Pulse Extend circuit 156 which produces a second film drive signal E having a period extending beyond that of the high level of the Q output of flip-flop 144. The second film drive signal E is gated by AND gate 158 to the second input terminal of OR gate 130 when both input terminals of the AND gate 158 are at a high level.

Thus, upon each occurrence of an order separation mark signal B, the film drive solenoid 52 is energized by the second film drive signal E for a period of time dependent upon the period of time that the Q output of the flip-flop 144 remains in the high level, that is, until the detection of a splice 82, as described hereinafter, and a period of time following the detection of a splice determined by the Pulse Extend circuit 156. The effect of the signal B is to energize the film drive solenoid 52 so that any remaining negatives in the customer film order corresponding to the print order from which the signal B is produced are continuously driven through the film gate. The continuous film motion is halted after the time period of the Pulse Extend circuit 156 expires by the detection of a splice and the production of a splice signal C.

The splice signal C generated by splice detector 76 and amplified by amplifier 160 is also a transitory positive going pulse that is applied to a first input terminal 162 of AND gate 166. The second input terminal 164 of AND gate 166 is normally at a positive level, so that the splice signal C is gated to the C input of J-K flip-flop 168. The J and K inputs of flip-flop 168 are connected in a manner similar to the connection shown for flip-flop 144 to the Q and Q output terminals, respectively. As in the description of operation of flip-flop 144, presumably the Q output terminal of flip-flop 168 has been previously switched to the high level. When a splice signal C is applied to the C input, the Q output is switched to the high level.

It will be recalled that the Q output of the flip-flop 144 has been previously set to a high level by a signal B. The Q outputs of the flip-flops 144 and 168 are connected to the input terminals of AND gate 170. After both Q outputs of the flip-flops 144 and 168 are switched to the high level, the AND gate 170 passes a high level signal through the OR gate 172 to the Trigger T input of a reset single shot 174. The reset single shot 174 responds to the high input level to generate a reset signal F which is applied to the CD inputs of the flip-flops 144 and 168 via conductor 176. The reset signal F therefore switches the Q outputs of the flip-flops 144 and 168 to the low level. After a time period dependent upon the time period of the Pulse Extend circuit 156, the second film drive signal E is terminated, and the film drive solenoid 52 is de-energized.

It will be recalled that the time delay element 116, flip-flop 120 and AND gate 112 are provided to prevent the first print mark signal A following, in time, an order separation mark signal B from energizing the film drive solenoid 52. The reason that the first print mark signal A is thus inhibited is because the second film drive signal E is of such duration (insured by the Pulse Extend circuit 156) that a film splice detected one negative frame length before the film gate 40, is advanced through the film gate 40 without stopping. Thus, the first negative of a second, succeeding, customer film order is positioned in the film gate 40 through the operation of the second film drive signal E and the first film drive signal D that would be produced in response to the first cut mark signal A is unnecessary.

When Condition 1 persists for first and second successive film and print orders, the final print mark 66 adjacent the final print 22 of the first customer print order will be detected as the final print 22 advances into the print inspection station 26. Simultaneously, as described hereinbefore, the first film drive signal D generated in response to the signal A will advance the final negative of the first customer film order into the film gate 40. An order separation signal B is generated in response to the detection of an order separation mark 68 on the border adjacent the final print 22 as it advances into the inspection station 26. Shortly following the generation of the last signal A of the first print order, as described hereinbefore, the second film drive signal E is generated in response to the signal B.

The second film drive signal E causes the film drive assembly 46 to advance the splice 82 past the splice detector 76 and through the film gate 40. When the splice signal C is generated by the splice detector 76, the reset signal F is generated to terminate the second film advance signal E after the time period of the Pulse Extend circuit 156 elapses. After the second film drive signal E terminates, the film will continue to advance until the detent 54 of the film drive solenoid 52 catches the next sprocket hole 56 positioning the first negative of the second customer film order in the film gate 40. At the same time, the first print 22 of the second customer print order advances past the pick-up 72 and into the print inspection station 26. Since the first signal A does not produce a first film advance signal D, the stepwise advancement of the second negative in the second customer film order into the film gate 40 is not initiated until the print mark 66 of the second print of the second customer print order advances past the pick-up 72 and into the print inspection station 26.

Thus, as succeeding customer film and print orders satisfying Condition 1 advance, a signal B immediately follows the signal A as the last print in the customer print order advances to the print inspection station 26, and a splice signal C immediately follows the signal B, as the splice is advanced past the splice detector 76 and through the film gate 40.

In the event that the operator observes an unacceptable print entering the print inspection station 26, the operator depresses a push button switch to stop print advance and marks the print located between marking guides 32 with a visual indication that it is unacceptable. The operator thereafter observes the negative image in the film gate 40 to insure that it corresponds to the print and to determine the color correction or exposure classification necessary to produce an acceptable print. The operator may also observe the exposure code printed on the border of the unacceptable print to determine the exposure conditions employed in the initial printing of the negative. After making his judgment of the negative and the print, the operator enters his subject classification and color corrections on the keyboard assembly 20 and reprints the negative by exposing the photosensitive paper in the light-tight cabinet 12 to light transmitted by the negative in the manner well known in the art. After the exposure is complete, the operator again depresses the push button switch to start print advance and to continue the inspection of the roll of prints.

Condition 2: Two Prints Per Negative

Under this condition, the synchronization circuit operates in the same manner as described with respect to Condition 1. However, occasionally, the customer requests or the photofinisher decides to give all customers more than one print, usually two prints, of each negative in the customer film order. In this instance, the operator of the print inspection and reprint apparatus 16 observes that the print roll contains two prints per negative and changes the connection of the switch blade 106 by means of a push button from the first contact 102 to the second contact 104 to connect the ÷ 2 flip-flop 98 to the pulse shaping single shot 108. The ÷ 2 flip-flop 98 is thus rendered effective to direct alternate print mark signals A to the single shot 108 and through the remaining circuit elements to produce a first film drive signal D having a frequency equal to half that of the print mark signal A. Thus the negatives are stepwise advanced as every other print mark 66 is detected by the pick-up 72. Synchronization is thereby maintained between the advancement of the two prints for every negative through the inspection station 26.

Condition 3: Fewer Prints than Negatives

As noted earlier, during the first passage of the negative through the photographic printer, either the operator of the printer or automatic sensing circuits may determine that certain negatives in a customer film order are too overexposed or under-exposed or are fogged or blank and are therefore unsuitable for printing. Consequently, the customer print order may contain fewer prints than negatives in the corresponding customer film order. For example, out of a customer film order of 20 negatives perhaps three are not printed, and the corresponding print order contains only 17 prints. As the 17th print of the print order advances through the print inspection station 26, the 17th negative is advanced to the film gate 40 as described hereinbefore with respect to Condition 1. Shortly thereafter, an order separation mark 68 is detected adjacent the 17th frame, and a signal B is generated by the pick-up 74. As described hereinbefore with respect to FIG. 3, the signal B is amplified and applied to the R input of flip-flop 120 and the C input of flip-flop 144. The Q output of the flip-flop 144 switches to the high level, and a second film drive signal E is generated in a manner hereinbefore described to continuously advance the remaining three negatives of the customer film order through the film gate 40 until such time as a splice 82 is sensed by splice detector 76.

The splice 82 segment advances past the film gate 40 in the manner hereinbefore described, and positions the first negative of the succeeding customer film order in the film gate 40. However, the print segment 44 will have also continued to advance into the next print order. The synchronization of the print 22 with the negative of the next customer order may therefore be disrupted by one or more negatives dependent upon the rate of advancement of the paper segment 44, the rate of continuous advancement of the remaining negatives of the first customer film order and the difference between the number of prints and negatives in the first customer print and film order.

The rate of continuous film advancement in response to the second film drive signal E is designed to be considerably higher than the maximum rate of print advancement. Consequently, the synchronization circuit of FIG. 3 continues to advance the negatives 43 in response to the first and second film drive signals. Synchronization of the prints and negatives in corresponding print and film orders will be reestablished by the operation of the circuit as described with respect to Condition 1 within one or two succeeding film and print orders satisfying Condition 1, depending upon the difference between the number of prints and negatives in the print and film order causing the loss of exact synchronization.

It should be noted that under Condition 3, the unsuitable negative may occur anywhere in the film order, and therefore synchronization between the negatives and prints of the corresponding film and print orders may be lost at any time in such an order. It should also be noted that a strong probability exists that within a print order satisfying Condition 3, the operator will find unacceptable prints that require reprinting. When the operator halts the advancement of the unacceptable print in the print inspection station 26, he may find that the negative in the film gate 40 does not correspond to the unacceptable print. However, since the other prints of the same customer print order are visible, the operator may readily determine the location of the print corresponding to the negative in the film gate 40. Under Condition 3, the lack of synchronism will be caused by fewer prints than negatives, and therefore the operator may advance the negatives one at a time until the corresponding negative is positioned in the film gate 40 by depressing the buttom provided for single frame advance noted hereinbefore.

Consequently, synchronization may be re-established by the operator as necessitated by the occurrence of unacceptable prints. In the absence of such unacceptable prints the synchronization will eventually be re-established because the rate of film advance exceeds the rate of print advance. The design of the synchronization circuit in this manner allows for the continuous advancement of the photographic prints through the print inspection station 26 without losing time by halting the advancement of the photographic prints until the negatives catch up with the prints.

In the special situation where all of the negatives of a customer film order are unsuitable for printing, an order separation mark 68 adjacent an exposed or unexposed portion of the photographic print material made during the initial printing of the roll of customer film orders will be advanced past the pick-up 74 into the print inspection station 26. The inspector will observe the blank or unacceptably exposed print area and halt the advancement of the print material. The signal B for this unacceptable print develops the second film drive signal E in the manner hereinbefore described to continuously advance the customer film order of unsuitable negatives through the film gate 40 until the flip-flop 144 is reset by a reset signal F developed at the time that the next splice is detected. The operator will readily observe that the customer film order is advancing continuously through the film gate 40 and will wait till such advancement is halted before restarting the print advancement into the next customer print order. In this manner the synchronization circuits 70 and the print inspector cooperate to re-establish synchronization in the special condition wherein all negatives of a customer film order are unsuitable for printing. Alternatively, provision may be made for an operator control to selectively prevent the application of the second film drive signal E to the film drive solenoid 52 so that the inspector may individually advance each negative through the film gate 40 to ascertain the reason why each negative was determined to be unsuitable for printing.

Condition 4: Fewer Prints than Negatives in Successive Orders

Under Condition 4 fewer prints than negatives occur in first and second successive corresponding film and print orders, and the order separation mark 68 on the second print order occurs before the splice 82 connecting the first and second film orders passes the film gate 40. Such a situation would occur when only a few prints are made in each of the first and second print orders from the corresponding film orders. In this situation the initial order separation signal $B_1$ switches the Q output of the flip-flop 144 to its high state and develops the second film drive signal E to continuously advance the remaining negatives in the first customer film order through the film gate 40. Thereafter, but before the splice 82 connecting the first and second film orders is detected, the pick-up 74 develops a second order separation mark signal $B_2$ as the last negative of the second customer print order advances to the print inspection station 26. The second order sort signal $B_2$ is applied to the C input of the flip-flop 144 and switches the Q output to the high level and the Q output to the low level. However, the OR gate 154 maintains Pulse Extend circuit 156 operative to produce the second film drive signal E.

The Q output of the flip-flop 144 is connected to the C input of the flip-flop 180. Since the flip-flop 180 was previously reset by a reset signal F applied to its CD input, the J input is at a high level and the K input is at a low level. The occurrence of the high level at the C input of the flip-flop 180 in response to the switching of the flip-flop 144 by the second order separation signal $B_2$ causes the Q output of the flip-flop 180 to be switched to the high level. The high level of the Q output of flip-flop 180 is transmitted by conductor 182 to the second input terminal 184 of the OR gate 154. The OR gate 154 gates the high level at the second input 184 to the Pulse Extend circuit 156. Since the switching of the levels of the outputs of the flip-flops 144 and 180 are virtually simultaneous with the occurrence of the second order separation signal $B_2$, the second film drive signal E continues to be generated to continuously advance the remaining negatives of the first customer film order through the film gate 40.

The Q output of the flip-flop 180 is also connected to the second input terminal 140 of AND gate 138 by conductor 186. Since the Q output of flip-flop 180 is normally at the high level, the AND gate 138 is normally operative to gate order separation signals B to the flip-flops 120 and 144. However, under the assumed condition, the Q output of flip-flop 180 is switched to the low level, and the AND gate 138 is therefore rendered inoperative to gate further order separation signals B to the flip-flops 120 and 144.

The Q output of flip-flop 180 is also connected by conductor 188 to the print drive motor 62, and the high level at the Q output produces a print drive inhibit signal G that is effective to turn off the print drive motor as the first print of the third customer print order of the series is advanced to the print inspection station 26.

Since print drive has been halted, the next signal to be received by the synchronization circuit 70 is the first splice signal $C_1$ generated in response to the detection of the splice 82 connecting the first and second customer film orders. The first splice signal $C_1$ is applied by AND gate 166 to the C input of flip-flop 168 in the manner hereinbefore described. The Q output of the flip-flop 168 is switched to its high level in response to the first splice signal $C_1$. However, the AND gate 170 is ineffective since the Q output of the flip-flop 144 is at the low level and, as a result, no reset signal F is produced. Therefore, the negatives of the second customer film order are continuously advanced through the film gate 40 in response to the second film drive signal E until the splice connecting the second film order to the third film order in the sequence is detected by splice detector 76 to produce a second splice signal $C_2$. The second splice signal $C_2$ is applied by AND gate 166 to the C input of the flip-flop 168 which responds thereto to switch its Q output to the low level and its Q output to the high level.

The Q output of the flip-flop 168 is connected to the C input of the flip-flop 192. Since the J input of the flip-flop 192 was previously set to its high level, the Q output of the flip-flop 192 is switched to the high level in response to the high level applied to the C input. Thus, upon the occurrence of the second splice signal $C_2$, the Q output of the flip-flop 168 is switched to its low level and the Q output of the flip-flop 192 is switched to the high level.

The Q output of the flip-flop 192 is connected by conductor 194 to the second input terminal 164 of the AND gate 166. When the Q output is switched to the low level, the AND gate 166 is rendered ineffective to gate further splice signals C to the C input of flip-flop 168.

The Q outputs of the flip-flops 180 and 192 are connected to the first and second input terminals 196 and 198, respectively, of the AND gate 200. It will be recalled that the Q output of the flip-flop 180 was previously switched to the high level upon the occurrence of the second order sort signal $B_2$. When the Q output of the flip-flop 192 is switched to the high level upon the occurrence of the second splice signal $C_2$, the AND gate 200 is rendered effective to transmit a signal through OR gate 172 to the T input of the reset single shot 174. The reset single shot 174 responds thereto in the manner hereinbefore described to develop a reset signal F that is transmitted by conductor 176 to the CD inputs of the flip-flops 98, 144, 168, 180 and 192 to reset the Q outputs of each flip-flop to the high level.

Consequently, at the occurrence of the second splice signal $C_2$, the flip-flops 98, 144, 168, 180 and 192 are reset, the print drive motor is turned on as the print drive inhibit signal G is removed from conductor 188, and film drive ceases when the second film drive signal E terminates. Thereafter, the first negative and print in the respective third customer film and print orders are positioned in the film gate 40 and the inspection station 26, respectively. Furthermore, the AND gates 92, 138 and 166 are rendered operative as the Q outputs of the flip-flops 168, 180 and 192 are switched to the high level by the reset signal F.

It should be noted that under Condition 4, film and print orders become so far out of synchronization that it becomes necessary to half print drive in the manner described above. Again, it may be noted that before this condition arises, the operator may have already decided to reprint a particular negative in one or the other of the film orders, and he may have synchronized the film and print orders in the same manner as described above with respect to Condition 3.

Condition 5: Fewer Negatives Than Prints

In case this Condition should arise, the splice signal C is produced before an order separation signal B is produced, and the signal C switches the Q and Q outputs of the flip-flop 168 to the low and high levels, respectively. The Q output of flip-flop 168 is connected by condutor 190 to the second input terminal 94 of AND gate 92. When the Q output of the flip-flop 168 is switched to the low level, the AND gate 92 is rendered incapable of gating further print mark signals A through the further elements of the circuit to the film drive single shot 126, and no further first film drive signals D will be produced. Thus, film motion is halted as soon as the detent 54 of the film drive solenoid 52 engages a sprocket hole in the film. In this situation, the splice 82 may not be advanced all the way through the film gate 40.

The prints in the corresponding customer print order continue to advance through the print inspection station 26, and any further signals A are ineffective to advance the film. Thereafter, a signal B is produced in response to the detection of the order separation mark on the last print in the customer print order advanced to the print inspection station 26. The signal B is applied to the C input of the flip-flop 144 to switch the Q output of the flip-flop 144 to the high level in the manner described hereinbefore. The high level of the Q output is transmitted by the Pulse Extend circuit 156 to produce a second film drive signal E. The second film drive signal E initiates the continued advancement of the splice 82 through the film gate 40. The AND gate 170 responds to the high levels of the Q outputs of the flip-flops 144 and 168 to trigger the reset single shot 174 which produces a reset signal F. Thus, upon the detection of the signal B, the film advance is initiated to continue for the time extension period of the Pulse Extend circuit 156, and the Q outputs of the flip-flops 144 and 166 are switched to the high level. When the Q output of the flip-flop 168 resumes the high level, the AND gate 92 is rendered operative to gate the print mark signals A of the succeeding print order through the circuit to trigger the film drive single shot 126 to produce the respective first film drive signal D. The synchronization circuit 70 continues to operate in the manner described with respect to Condition 1.

Under the assumed Condition, the synchronization of prints and negatives within an order is lost and, if the operator finds it necessary to make a reprint of an unacceptable print, he halts the advancement of the unacceptable print in the print inspection station 26 and observes the negative in the film gate 40 to correlate it to the other prints in the customer print order. Under this Condition, the corresponding negative is ahead, in the path of travel, of the unacceptable print. A further control may be provided for the operator's convenience to selectively reverse the stepwise advancement of the negatives through the film gate 40 until the corresponding negative is positioned in the film gate 40. Otherwise, the operator may have to manually pull the negatives from left to right through the film gate 40 to reach the proper negative.

CONCLUSION

Thus, there has been shown print inspection and reprint apparatus for attachment to a photographic printer including roll film and roll paper advancing apparatus for stepwise advancing each negative of customer film orders through the film gate of the photographic printer and for continuously advancing each print in the customer print orders on the print roll through an inspection station under the control of a circuit for maintaining synchronization between the respective print and film orders. The synchronization circuit is effective to automatically maintain or reestablish synchronization between corresponding print and film orders, and the design of the synchronization circuit economically maintains continuous print advancement under most conditions. While exact synchronization between each negative and print in each customer film and print order cannot be maintained under all conditions, the synchronization circuit makes it possible for the operator to readily locate the negative corresponding to an unacceptable print.

As stated hereinbefore, reflective print and order separation mark pick-ups may be provided on opposite surfaces of the photographic print material to detect the respective marks printed on either side. It will be apparent also that such reflective pick-ups may be provided in alternate positions to detect the respective marks if the order separation mark is printed upon the first print in each customer print order advanced into the inspection station.

Furthermore, it should be noted that film types other than that film segment 42 shown in FIG. 2 may be accommodated by the print inspection and reprint apparatus through the use of a film drive assembly other than film drive assembly 46 but suitable for controlling the stepwise advancement of each negative through the film gate 40.

Furthermore, it is within the scope of this invention to re-orient the position of the elements of FIG. 2 and change the direction of movement of the paper and film through the print inspection and reprinting apparatus.

Although the logic elements employed in the synchronization circuit 70 have been responsive to positive going or high levels, it will be apparent that negative going signal and low level responsive logic elements may be substituted for those shown where appropriate.

The invention has been described in detail with particular reference to preferred embodiments thereof, but it will be understood that variations and modifications can be effected within the spirit and scope of the invention.

I claim:

1. A method for synchronizing the advancement of photographic originals in a plurality of customer original film orders attached together at their respective ends to form a film roll into the exposure station of a photographic printer in synchronism with the advancement of finished photographic prints in a series of corresponding customer print orders on a roll of developed print material through a print inspection station for inspecting the prints to detect commercially unacceptable prints and to reprint said unacceptable prints with the correction necessary to produce an acceptable print, each customer print order having a selected print associated therewith to indicate separate consecutive print orders, said synchronization method comprising the steps of:
   detecting the continuous advancement of each print in each customer print order into said print inspection station and stepwise advancing an original into said exposure station in response to the detection of each print;
   detecting the continuous advancement of at least one selected print associated with each customer print order to separate customer print orders into said print inspection station;
   detecting the stepwise advancement of the attached ends of the plurality of customer film orders into said exposure station; and
   preventing the stepwise advancement of the originals into said exposure station in response to the advancement of a print into said print inspection station for the time period between the detection of an attached end and the selected print when there are fewer photographic originals than prints in corresponding customer film and print orders.

2. A method for synchronizing the advancement of photographic originals in a plurality of customer original film orders attached together at their respective ends to form a film roll into the exposure station of a photographic printer in synchronism with the advancement of finished photographic prints in a series of corresponding customer print orders on a roll of developed print material through a print inspection station for inspecting the prints to detect commercially unacceptable prints and to reprint said unacceptable prints with the correction necessary to produce an acceptable print, each customer print order having a selected print associated therewith to indicate separate consecutive print orders, said synchronization method comprising the steps of:
   detecting the continuous advancement of each print in each customer print order into said print inspection station and stepwise advancing an original into said exposure station in response to the detection of each print;
   detecting the continuous advancement of at least one selected print associated with each customer print order to separate customer print orders into said print inspection station;
   detecting the stepwise advancement of the attached ends of the plurality of customer film orders into said exposure station; and
   continuously advancing the remaining originals in a customer film order and the attached end of a customer film order through said exposure station until the first original of the following customer film order is advanced into said exposure station for the time period between the detection of the selected print and the attached end of the corresponding customer film order, when there are fewer prints than photographic originals in the corresponding customer film and print orders.

3. A method for synchronizing the advancement of photographic originals in a plurality of customer original film orders attached together at their respective ends to form a film roll into the exposure station of a photographic printer in synchronism with the advancement of finished photographic prints in a series of corresponding customer print orders on a roll of developed print material through a print inspection station for inspecting the prints to detect commercially unacceptable prints and to reprint said unacceptable prints with the correction necessary to produce an acceptable print, each customer print order having a selected print associated therewith to indicate separate consecutive print orders, said synchronization method comprising the steps of:
   detecting the continuous advancement of each print in each customer print order into said print inspection station and stepwise advancing an original into said exposure station in response to the detection of each print;
   detecting the continuous advancement of at least one selected print associated with each customer print order to separate customer print orders into said print inspection station;
   detecting the stepwise advancement of the attached ends of the plurality of customer film orders into said exposure station; and
   halting the continuous advancement of the prints into said print inspection station upon the detection of the selected print of a second consecutive customer print prior to the detection of the attached ends of the corresponding first and second customer film orders and continuously advancing the first and second customer film orders through said exposure station until the detection of the attached ends of the second and third customer film orders in sequence when there are fewer prints than photographic originals in first and second successive corresponding customer film and print orders.

4. In photographic apparatus for advancing finished photographic prints in a series of consecutive customer print orders on a roll of developed print material through a print inspection station for inspecting the prints to detect commercially unacceptable prints and to reprint, with the correction necessary to produce an acceptable print, the corresponding photographic original in the corresponding customer original film order of a plurality of customer film orders attached together at their respective ends to form a film roll, each customer print order having a selected print associated therewith to indicate separate consecutive print orders; the improvement comprising synchronization apparatus responsive to the continuous advancement of the prints for cntrolling the stepwise advancement of the originals of a customer film order corresponding to the print order through the exposure station of a photographic printer associated with the print inspection apparatus, whereby the original in the exposure station corresponding to a print found to be commercially unacceptable may be reprinted in the photographic printer, said synchronization apparatus further comprising:
   a. first means for detecting the continuous advancement of each print into said print inspection station and for stepwise advancing an original into said exposure station in response to each detected print;
   b. second means for detecting the selected prints associated with each customer print order continuously advanced into said print inspection station and for continuously advancing the originals in the customer film order through said exposure station in response to each detected print;
   c. third means for detecting the attached ends of the plurality of customer film orders and for halting the continuous advancement, initiated by said selected print detecting means, of the originals in the customer film order through said exposure station after the detected attached end is advanced through said exposure station; and
   d. means for halting the continuous advancement of a commercially unacceptable print within the print inspection station, whereby the corresponding original in said exposure station of said photographic printer may be reprinted with exposure corrections based on the assessment of the exposure conditions of the unacceptable print.

5. The synchronization apparatus of claim 4 further comprising means for varying the rate of continuous advancement of the prints through said print inspection station.

6. The synchronization apparatus of claim 4 further comprising means responsive to the third means for detecting the attached ends of the plurality of customer film orders for preventing the stepwise advancement of the originals into said exposure station by said first means for detecting the prints.

7. The synchronization apparatus of claim 4 wherein a customer print order contains a greater number of prints than the number of corresponding originals in the corresponding customer film order and further comprising:
   a. means responsive to the third means for detecting the attached ends of the plurality of customer film orders for preventing the stepwise advancement of the originals into said exposure station by said first means for detecting the prints; and
   b. means responsive to said second means for detecting the selected prints for advancing a detected attached end through said exposure station until an original in the next customer film order adjacent said attached end is positioned in said exposure station;
whereby the stepwise advancement of the originals is halted for the period of time between the direction of the attached end of the customer film order and the selected print of the corresponding customer print order.

8. The synchronization apparatus of claim 4 wherein first and second consecutive customer print orders contain a fewer number of prints than the number of originals in the corresponding consecutive first and second customer film orders and further comprising:
   a. means responsive to the detection of the selected print associated with the second print order for stopping the continuous advancement of the prints; and
   b. means responsive to the detection of the attached ends of the second and a consecutive third customer film order for restarting continuous print advancement.

9. In photographic apparatus for advancing finished prints in a series including at least first and second consecutive customer print orders on a roll of developed print material through a print inspection station for inspecting the prints to detect commercially unacceptable prints and to reprint, with the correction necessary to produce an acceptable print, the corresponding negative in the corresponding customer film order of a plurality including at least first and second consecutive customer film orders attached together at their respective ends to form a film roll, each print having a first mark associated therewith on the print material and each customer print order having a second mark associated therewith on the print material; the improvement comprising synchronization apparatus responsive to the continuous advancement of the prints for controlling the stepwise advancement of the negatives of a customer film order corresponding to the prints through the exposure station of a photographic printer associated with the print inspection apparatus, whereby the negative corresponding to a print found to be commercially unacceptable may be reprinted in the photographic printer, said synchronization apparatus further comprising:
   a. first means for detecting the first marks associated with said prints continuously advanced through said print inspection station and for stepwise advancing a negative into said exposure station in response to each detected first mark;
   b. second means for detecting (i) the second marks associated with each customer print order continuously advanced through said print inspection station and (ii) the attached ends of the plurality of customer film orders and control means responsive to said second means for detecting for halting the stepwise advancement of the negatives into said exposure station when the detection of the attached ends of first and second consecutive customer film orders precedes, in time, the detection of a second mark associated with the corresponding first customer print order, and for continuously advancing the remaining negatives in the first customer film order and the attached ends of the first and second customer film orders through said exposure station until the first negative of the second customer film order is advanced into said exposure station when the detection of the second mark associated with the first customer print order precedes, in time, the detection of the attached ends of the first and second customer film orders; and c. means for halting the continuous advancement of a commercially unacceptable print within the print inspection station, whereby the negative in said exposure station of said photographic printer corresponds to the unacceptable print when the number of prints in the customer print order containing the unacceptable print equals the number of negatives in the corresponding customer film order, and the negative may be reprinted with exposure corrections based on the assessment of the exposure of the unacceptable print.

10. In photographic apparatus for advancing finished prints in a series of consecutive customer print orders on a roll of developed print material through a print inspection station for inspecting the prints to detect commercially unacceptable prints and to reprint, with the correction necessary to produce an acceptable print, the corresponding negative in the corresponding customer film order of a plurality of customer film orders spliced together at their respective ends to form a film roll, each print having a first mark associated therewith on the print material and each customer print order having a second mark associated therewith on the print material; the improvement comprising synchronization apparatus responsive to the continuous advancement of the prints for controlling the stepwise advancement of the negatives of a customer film order corresponding to the prints through the exposure station of a photographic printer associated with the print inspection apparatus, whereby the negative corresponding to a color print found to be commercially unacceptable may be reprinted in the photographic printer, said synchronization apparatus further comprising:

a. means for detecting the first marks associated with said prints continuously advanced through said print inspection station and for stepwise advancing a negative into said exposure station in resisponse to each detected first mark;

b. means for detecting the second marks associated with each customer print order continuously advanced through said print inspection station and for continuously advancing the negatives in the customer film order through said exposure station in response to each detected second mark;

c. means for detecting the spliced ends of the plurality of customer film orders and for halting the continuous advancement, initiated by said second mark detecting means, of the negatives in the customer film order through said exposure station after each detected spliced end is advanced through said exposure station; and d. means for halting the continuous advancement of a commercially unacceptable print within the print inspection station, whereby the negative in said exposure station of said photographic printer corresponds to the unacceptable print when the number of prints in the customer print order containing the unacceptable print equals the number of negatives in the corresponding customer film order, and the negative may be reprinted with exposure corrections based on the assessment of the exposure of the unacceptable print.

11. The synchronization apparatus of claim 10 further comprising means responsive to said means for detecting the first and second marks for preventing said means for stepwise advancing the negatives from responding to the detected first mark immediately following, in time, a detected second mark.

12. The synchronization apparatus of claim 10 further comprising means for varying the rate of continuous advancement of the prints through said print inspection station.

13. The synchronization apparatus of claim 10 wherein a customer print order contains two prints made from each negative in the corresponding customer film order, and wherein said means for detecting the first marks is selectively operable to detect alternate first marks associated with alternate prints for stepwise advancing each negative into said exposure station in response to each detected alternate first mark.

14. The synchronization apparatus of claim 10 further comprising means responsive to the means for detecting the spliced ends of the plurality of customer film orders for preventing the stepwise advancement of the negatives into said exposure station by said means for detecting the first marks associated with said prints.

15. The synchronization apparatus of claim 10 wherein a customer print order contains a greater number of prints than the number of corresponding negatives in the corresponding customer film order and further comprising:

a. means responsive to the means for detecting the spliced ends of the plurality of customer film orders for preventing the stepwise advancement of the negatives into said exposure station by said means for detecting the first marks associated with said prints; and b. means responsive to said means for detecting the second marks for advancing the detected spliced end through said exposure station until a negative in the next customer film order adjacent said spliced end is positioned in said exposure station; whereby the stepwise advancement of the negatives in a customer film order is halted for the period of time between the detection of the spliced end of the customer film order and the second mark of the corresponding customer print order.

16. The synchronization apparatus of claim 10 wherein first and second consecutive customer print orders contain a fewer number of color prints than the number of color negatives in the corresponding consecutive first and second customer film orders and further comprising:

a. means responsive to the detection of the second mark associated with the second print order prior to the detection of the spliced ends of the first and second customer film orders for stopping the continuous advancement of the color prints; and b. means responsive to the detection of the spliced ends of the second and a consecutive third customer film order for restarting continuous color print advancement.

17. The synchronization apparatus of claim 10 wherein first and second consecutive customer print orders contain a fewer number of prints than the number of negatives in the corresponding consecutive first and second customer film orders and further comprising:
  a. first resettable counting and storage means responsive to said means for detecting the second marks for counting and storing the number of detected second marks;
  b. second resettable counting and storage means responsive to said means for detecting the spliced ends for counting and storing the number of detected spliced ends;
  c. means responsive to the first resettable counting and storage means for halting the continuous advancement of the prints through said print inspection station when aid first resettable counting and storage means counts to two detected second marks; and
  d. reset means responsive to the first and second resettable counting and storage means for resetting the counting of the first and second resettable counting and storage means to zero when the first and second resettable counting and storage means simultaneously achieve the same count;
  whereby the detection of the second mark associated with the second print order prior to the detection of the spliced ends of the first and second film orders produces a count of two on the first resettable counting and storage means and halts the print advancement while the first and second film orders continuously advance under the control of the means for detecting the second marks until a count of two is achieved in said second resettable counting and storage means, and print and film advancement resumes in synchronization upon the operation of said reset means.

18. In photographic apparatus for advancing finished color prints in a series including at least first and second consecutive customer print orders on a roll of developed print material through a print inspection station for inspecting the color prints to detect commercially unacceptable prints and the re-print, with the correction necessary to produce an acceptable print, the corresponding color negative in the corresponding customer film order of a plurality including at least first and second consecutive customer film orders spliced together at their respective ends to form a film roll; the improvement comprising synchronization apparatus responsive to continuous advancement of the color prints for controlling the stepwise advancement of the color negatives of a customer film order corresponding to the color prints through the exposure station of a photographic printer associated with the print inspection apparatus, whereby the color negative corresponding to a color print found to be commercially unacceptable may be reprinted in the photographic printer, said synchronization apparatus further comprising:
  a. first means for detecting the continuous advancement of each color print into said print inspection station and for stepwise advancing a color negative into said exposure station in response to each detected color print;
  b. second means for detecting (i) a selected color print associated with each customer print order continuously advanced into said print inspection station and (ii) the spliced ends of the plurality of customer film orders;
  c. control means responsive to said second means for detecting for:
    1. halting the stepwise advancement of the color negatives into said exposure station when the detection of the spliced ends of first and second consecutive customer film orders precedes, in time, the detection of the selected color prints associated with the corresponding first customer print order;
    2. continuously advancing the remaining color negatives in the first customer film order and the spliced ends of the first and second customer film orders through said exposure station until the first color negative of the second customer film order is advanced into said exposure station when the detection of the selected color print associated with the first customer print order precedes, in time, the detection of the spliced ends of the first and second customer film orders; and
    3. halting the continuous advancement of the color print into said print inspection station when the detection of the selected color print associated with the second customer print order precedes the detection of the spliced end of the first and second customer film orders and for continuously advancing the first and second customer film orders through said exposure station until the detection of the spliced ends of the second and third customer film order; and
  d. means for halting the continuous advancement of a commercially unacceptable color print within the print inspection station, whereby the color negative in said exposure station of said photographic printer corresponds to the unacceptable color print when the number of color prints in the customer print order containing the unacceptable color print equals the number of color negatives in the corresponding customer film order, and the color negative may be re-printed with exposure corrections based on the assessment of the exposure of the unacceptable print.

19. In photographic apparatus for advancing finished color prints in a series of consecutive customer print orders on a roll of developed print material through a print inspection station for inspecting the color prints to detect commercially unacceptable prints and to re-print, with the correction necessary to produce an acceptable print, the corresponding color negative in the corresponding customer film order of a plurality of customer film orders spliced together at their respective ends to form a film roll, each color print having a first mark associated therewith on the print material and each customer print order having a second mark associated therewith on the print material; the improvement comprising synchronization apparatus responsive to the continuous advancement of the color print for controlling the stepwise advancement of the color negatives of a customer film order corresponding to the color prints through the exposure station of a photographic printer associated with the print inspection apparatus, whereby the color negative corresponding to a color print found to be commercially unacceptable may be re-printed in the photographic printer, said synchronization apparatus further comprising:
  a. means for detecting the first marks associated with said color prints continuously advanced through said print inspection station for producing a first signal in response to each detected first mark;

b. means for detecting the second marks associated with each customer print order continuously advanced through said print inspection station for producing a second signal in response to each detected second mark;

c. means for detecting the spliced ends of the plurality of customer film orders and for producing a third signal in response to each detected spliced end;

d. film drive means responsive to the first signal for stepwise advancing a color negative into said exposure station and responsive to said second signal for continuously advancing the color negatives in a customer film order through said exposure station;

e. means responsive to the third signal for halting the continuous advancement, initiated by the second signal, of the color negatives in a customer film order through said exposure station by said film drive means after a time period sufficient to insure the advancement of the detected spliced end through said exposure station; and f. means for halting the continuous advancement of a commercially unacceptable color print within the print inspection station, whereby the color negative in said exposure station of said photographic printer corresponds to the unacceptable color print when the number of color prints in the customer print order containing the unacceptable color print equals the number of color negatives in the corresponding customer film order, and the color negative may be re-printed with exposure corrections based on the assessment of the exposure of the unacceptable print.

20. The synchronization apparatus of claim 19 further comprising means responsive to the first signal and the second signal for preventing the stepwise advancement of a color negative by said film drive means in response to the first signal immediately following, in time, a second signal, whereby the following second detected first signal corresponding to the second color print in a customer print order advanced to the print inspection station initiates the stepwise advancement of the second color negative in the corresponding customer film order in the exposure station of the printer.

21. The synchronization apparatus of claim 19 further comprising means for varying the rate of continuous advancement of the color prints through said print inspection station.

22. The synchronization apparatus of claim 19 wherein a customer print order contains two color prints made from each color negative in the corresponding customer film order, and further comprising means selectively operable to apply alternate first signals detected from alternate color prints to said film drive means for stepwise advancing each color negative into said exposure station in response to every other first signal.

23. The synchronization apparatus of claim 19 wherein a first customer print order contains a greater number of color prints than the number of corresponding color negatives in the corresponding first customer film order and further comprising:

a. first resettable means responsive to the third signal produced in response to the detection of the spliced end of said first customer film order for preventing, until reset, the stepwise advancement of the color negatives in a second customer film order into said exposure station by said film drive means responsive to the first signals;

b. second resettable means responsive to the second signal produced in response to the detection of a second mark associated with said first customer print order for advancing, until reset, the detected spliced ends of said first and second customer film orders through said exposure station until a color negative in said second customer film order adjacent said spliced ends is positioned in said exposure station; and c. reset means responsive to the second and third signals for resetting the first and second resettable means;

whereby the stepwise advancement of the color negatives in said second customer film order is halted for the period of time between the detection of the spliced ends of the first and second customer film orders and the second mark of said first customer print order.

24. The synchronization apparatus of claim 19 wherein first and second consecutive customer print orders contain a fewer number of color prints than the number of color negatives in the corresponding consecutive first and second customer film orders and further comprising:

a. means responsive to the second signal produced in response to the detection of the second mark associated with the second print order for stopping the continuous advancement of the color prints; and b. means responsive to the third signal produced in response to the detection of the spliced ends of the second and a consecutive third customer film order for restarting continuous color print advancement.

25. The synchronization apparatus of claim 19 wherein first and second consecutive customer print orders contain a fewer number of color prints than the number of color negatives in the corresponding consecutive first and second customer film orders and further comprising:

a. first resettable signal counting and storage means for counting and storing the second signals produced by the second mark detecting means;

b. second resettable signal counting and storage means for counting and storing the third signals produced in response to said means for detecting the spliced ends;

c. reset means responsive to the first and second resettable signal counting and storage means for resetting the count of the first and second resettable signal storage means to zero when the first and second resettable signal counting and storage means simultaneously achieve the same count;

d. means for applying the stored second signals to said film drive means to continuously advance the color negatives through said exposure station for the time period between the counting and storage of the second and third signals and an extended time period sufficient to advance spliced ends of consecutive film orders through said exposure station; and e. means responsive to the first resettable signal counting and storage means for halting the continuous advancement of the color prints through said print inspection station when said first resettable signal counting and storage means counts and stores two second signals;

whereby the production and storage of the second signal in response to the second mark associated with the second print order prior to the production and storage of a third signal in response to the detection of the spliced ends of the first and second film orders produces a count of two on the first resettable signal counting and storage means and halts the print advancement while the first and second film orders continuously advance under the control of the film drive means responsive to the stored second signals until two third signals are counted in said second resettable counting and storage means, and print and film advancement resumes in synchronization upon the operation of said reset means.

* * * * *